UNITED STATES PATENT OFFICE.

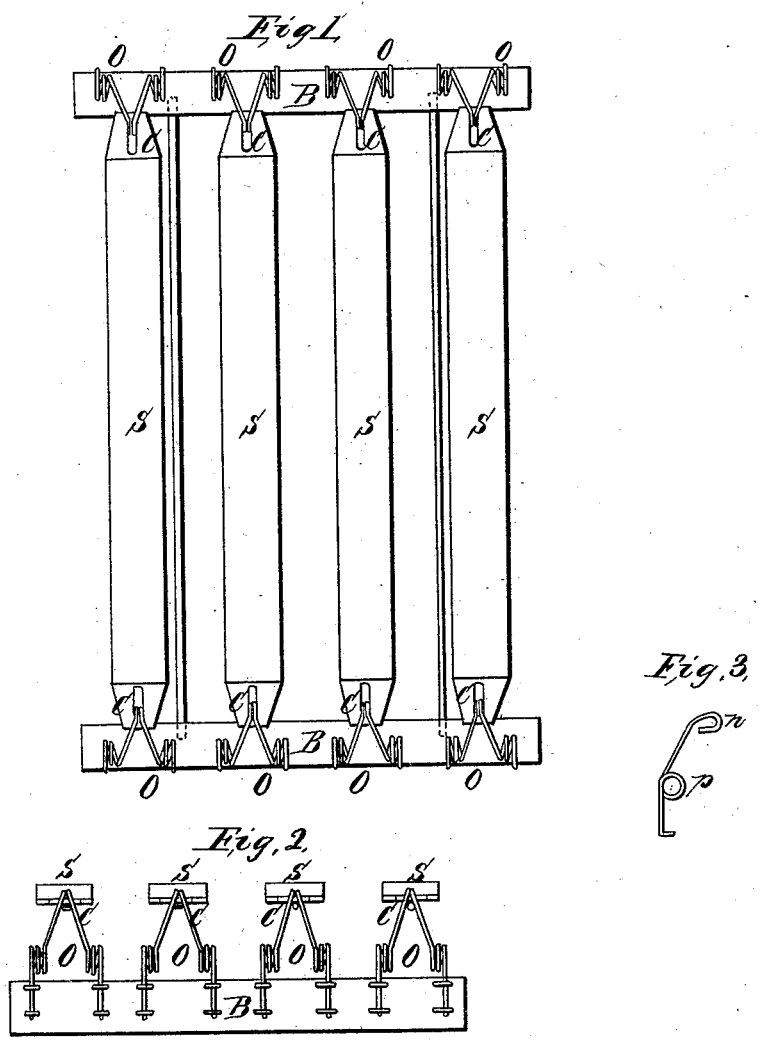

EDMUND SMITH, JR., AND ALONZO CHASE, OF WORCESTER, MASSACHUSETTS.

IMPROVED BED-BOTTOM.

Specification forming part of Letters Patent No. 57,395, dated August 21, 1866.

*To all whom it may concern:*

Be it known that we, EDMUND SMITH, Jr., and ALONZO CHASE, of the city and county of Worcester, State of Massachusetts, have invented certain new and useful Improvements in Spring Bed-Bottoms; and we do hereby declare the following to be a full, clear, and exact account and description of the construction of the same, reference being had to the accompanying drawings, in which drawings—

Figure 1 is a view of our invention from above. Fig. 2 is a view endwise of the slats S S S S. Fig. 3 shows the spring O as seen sidewise of the slats S S S S.

The same letters indicate the same parts where they occur in all.

The object of our invention is to produce a yielding elastic bed-bottom with the slats independent of each other in their action. To these ends its nature consists in so supporting the slats, by means of flexible connections to springs at each end of such triangular construction, as to brace them sidewise, and at the same time give them an elastic support.

S S S S are the slats, with the leathers C C C (or some flexible connection) fastened to their ends, having holes to catch on the hooks of the springs O O O, which springs are made by doubling the wire together in the middle and forming the hook $n$ there, as in Fig. 3, then separating the ends to a triangular form, and forming the coils $p$ on each, and fitting the ends to be firmly secured in the frame B, or bedstead, if preferred. This spreading the ends and fastening them apart, as shown in Figs. 1 and 2, gives a brace each way to each hook holding against any sidewise tendency, and entirely obviates the necessity of any strap or connection between the slats, and leaves them free of each other in action and capable of being depressed without pulling the others sidewise, as is the case where the slats are connected.

What we claim as new, and desire to secure by Letters Patent, is—

The triangular bracing form of the coil-springs, connected at one point to the slats S S, and the base to the bar or frame B, substantially as above set forth and described.

EDMUND SMITH, JR.
    ALONZO CHASE.

Witnesses:
 J. G. ARNOLD,
 L. A. G. ARNOLD.